Nov. 5, 1968                    H. J. BRYAN                    3,409,248
         ROTARY WINGED AIRCRAFT WITH DRAG PROPELLING ROTORS AND CONTROLS
Filed Oct. 22, 1965                                       5 Sheets-Sheet 1

INVENTOR
HARVARD J. BRYAN
BY
ATTORNEY

Nov. 5, 1968          H. J. BRYAN          3,409,248

ROTARY WINGED AIRCRAFT WITH DRAG PROPELLING ROTORS AND CONTROLS

Filed Oct. 22, 1965          5 Sheets-Sheet 4

INVENTOR
HARVARD J. BRYAN
BY
*Richards Harris & Hubbard*
ATTORNEY

United States Patent Office 3,409,248
Patented Nov. 5, 1968

3,409,248
ROTARY WINGED AIRCRAFT WITH DRAG
PROPELLING ROTORS AND CONTROLS
Harvard J. Bryan, 9303 Sorrento, Dallas, Tex. 75228
Filed Oct. 22, 1965, Ser. No. 502,184
17 Claims. (Cl. 244—6)

ABSTRACT OF THE DISCLOSURE

An aircraft with an elongated body having fixed laterally extending wings with at least one power rotor positioned above the body. The rotor includes a hub with a plurality of airfoil shaped blades extending therefrom; each blade comprises a plurality of movable surfaces symmetrically arranged with respect to the upper and lower surfaces of the blade. A first rotor control is provided for individually, cyclically, and symmetrically varying the shape of each blade for increased drag during the retreat of the blade to provide thrust. A second rotor control is provided for feathering all the rotor blades about their respective feathering axis for lift control.

This invention relates to rotary winged aircraft and to rotors and controls that provide both vertical and horizontal propulsion, and more particularly to generation of drag for use by the rotor blades to produce horizontal propulsion.

A helicopter obtains horizontal flight through the effects of cyclic pitch of the rotor blades. Various types of propulsion arrangements are well known in the helicopter art for producing vertical and horizontal flight. Also known in the helicopter art are rotors with variable drag. The present invention employs the latter principle to induce drag on the rotor blades as they move in the direction opposite to the chosen direction of flight. As in the helicopter art, vertical propulsion and hover may be obtained through controlled collective pitch of the rotor blades.

In the use of cyclic pitch control of the rotor blades of rotary winged aircraft for providing horizontal flight, objectionable vibration and speed limitations are present. Nevertheless, the helicopter has been successful to the degree that it is at present the most widely adopted system throughout the world.

In accordance with the present invention, horizontal flight is obtained by means other than that of cyclic pitch. Other attempts have been made to perfect rotor and control systems that depart from the cyclic pitch method, in developing ways of providing horizontal flight. None are found to be as acceptable as that of the cyclic pitch control system.

Problems which contributed to failure in some of those systems are now known, the most prevalent one being the spoiling of too much of the rotor blade airfoil shape while still depending on it for lift.

Aircraft configurations are dictated in the present invention by characteristics of a drag prop to provide for both vertical and short take-off and landing aircraft.

Such configurations, referred to herein as converticopters, have the unique capability of the rotary wings to make a complete conversion from vertical lift to horizontal thrust, thus permitting the aircraft to make a complete conversion from rotary winged lift in vertical flight to fixed wing lift in horizontal flight without tilting either the non-rotating wing or the axis of rotation of the rotary wing. Though a compound helicopter, employing both fixed wings and rotary wings, might have the same general appearance as a converticopter, basic differences exist between them. The rotary wings of a compound helicopter cannot convert from direct vertical lift to direct horizontal propulsion though they can cause horizontal movement by creating an unequal lift condition in which actual thrust is not in the direction of flight. If components, such as jet engines and pusher propellers, are employed to increase horizontal speed by providing thrust in the direction of flight as a supplement to the rotary wings, undesirable effects occur because of the two conflicting directions of thrust.

When the rotor blades of a compound helicopter are unloaded relative to lift, i.e., are set to zero angle of attack, to avoid such conflict while the aircraft is in forward flight, rotary wings serve no useful purpose and adversely affect flight of the aircraft.

In accordance with the invention, the rotary blade aircraft is provided in which the configuration of the blade is cyclically varied to produce increased drag in the retreating portion of each cycle while maintaining the blade substantially symmetrical. In a further aspect, a hub disk is provided for the rotor blades to prevent undesirable upward flow of air between the inner ends of the rotor blades, either in vertical flight or in hover.

For a more complete understanding of the present invention and for further objects and advantages thereof, reference may now be had to the following description taken in conjunction with the accompanying drawings in which.

Figures 1, 3:
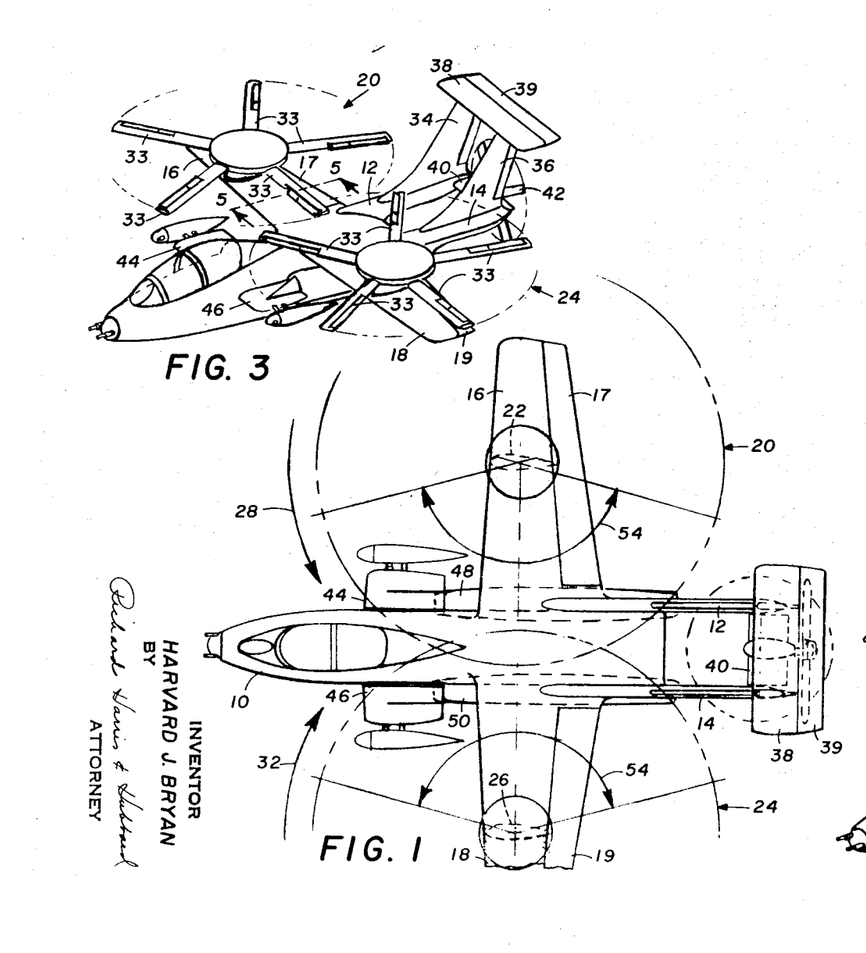
FIGURE 1 is a plan view of a dual rotor, twin tail boom, type aircraft embodying the present invention.
FIGURE 3 is a perspective view of the aircraft of FIGURE 1 in the horizontal flight regime.
Figure 2:
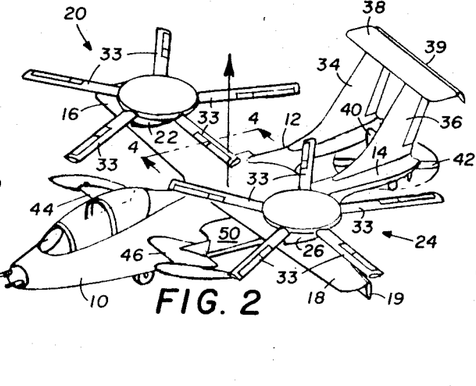
FIGURE 2 is a perspective view of the aircraft of FIGURE 1 in the vertical flight regime.

In FIGURES 1–3 a converticopter embodying the present invention is shown. Whether the aircraft employs a single drag-prop or a plurality of drag-props as shown in FIGURES 1–3, thrust is created by induced drag on the rotor blades in the horizontal flight regime in the direction of flight. The aircraft is susceptible to varied means of horizontal thrust to supplement thrust of the drag-prop.

In accordance with the invention, vertical take-off operation of a converticopter is initiated with the rotor blades rotating with zero angle of attack and with no induced drag on the rotor blades. The angle of attack of all rotor blades is then increased equally until sufficient lift is obtained for vertical flight. At the desired height drag surfaces are gradually actuated to induce drag and hence horizontal movement. As horizontal speed increases, drag of the rotor blades is increased in the retreating half cycle. As lift of fixed wings gradually increases due to forward flight, collective pitch of the rotor blades is gradually decreased. When conversion of the main rotors and fixed wing flaps is complete, the rotor blades, providing no lift, serve only to provide horizontal thrust. The fixed wings provide sufficient lift to sustain horizontal flight.

The converticopter configurations utilizing the twin rotors of FIGURES 1–3 and a tail rotor, employ controls that permit the tail rotor, a tilt-prop, to be converted from its position of rotating about a substantially vertical axis, where it serves to stabilize and balance lift on vertical take-off, to serve as a pusher-prop.

Referring now to FIGURES 1–3, the aircraft is of the rotary wing type wherein the rotors provide not only vertical lift but horizontal thrust. The unit has a fixed wing and thus is a compound unit.

More particularly, the fuselage 10 is provided with a pair of tail booms 12 and 14. Wings 16 and 18 extend laterally from fuselage 10 at substantially the midpoint thereof. A first rotor 20 is mounted on a pylon 22 above wing 16. The second rotor 24 is mounted on pylon 26 above wing 18. The rotors 20 and 24 are counter-rotated, the rotor 20 rotating in the direction of arrow 28 and the rotor 24 rotating in the direction of arrow 32. The wing 16 has a trailing edge flap 17. The wing 18 has a trailing edge flap 19.

As best seen in FIGURE 2, the rotors 20 and 24 each comprise similar five blades 33. The rotors are synchronized in their rotation so that the blades 33 are overlapping but intermeshed so that they do not interfere.

The booms 12 and 14 support vertical stabilizers 34 and 36. A horizontal stabilizer 38 is supported above the vertical stabilizers 34 and 36 and spans the distance between them. An elevator 39 along the aft edge of stabilizer 38 is pivotally attached thereto. A drive unit 40 is supported between the booms 12 and 14 and drives a tail rotor 42. A pair of removable fins 44 and 46 are attached to the fuselage immediately forward of engine air scoops 48 and 50 to pivot about a common horizontal axis.

The aircraft is shown in FIGURE 2 ready for vertical take-off. The wing flaps 17 and 19 are dropped downward. The elevator 39 is dropped downward. The tail rotor 42 facing downward is positioned to rotate about a substantially vertical axis. The fins 44 and 46 are positioned to force engine air to be pulled from above.

Rotation of rotors 20 and 24 will serve to lift the craft vertically. For take-off, the pitch of all of the blades on rotors 20 and 24 are the same for vertical lift and thus, are in a collective pitch state. The tail rotor also has collective pitch and serves to balance the aircraft in vertical flight and hover.

In FIGURE 3 the aircraft is shown in forward flight. In this condition, fins 44 and 46 have been rotated to the horizontal plane, and drive unit 40 has been rotated so that the tail rotor 42 is now a pusher propeller. Wing flaps 17 and 19 and elevator 39 have been raised in the transition to horizontal flight. The blades 33 of the rotors 20 and 24 serve to provide thrust by actuation of drag surfaces 44 which are shown in more detail in FIGURE 5. The lift provided by wings 16 and 18 maintains the aircraft at the selected altitude.

Figure 4:
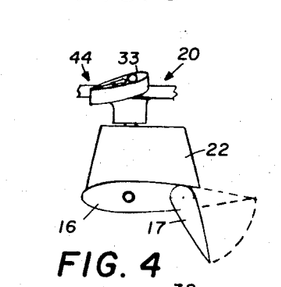
FIGURE 4 is a sectional view taken along a vertical plane which includes line 4—4 of FIGURE 2 to show the relative position of wing flaps and rotor blades in the vertical flight regime.
Figure 5:
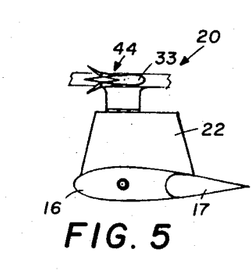
FIGURE 5 is a sectional view taken along a vertical plane which includes line 5—5 of FIGURE 3 to show the relative position of wing flaps, rotor blades and rotor blade drag surfaces in horizontal flight regime.

FIGURES 5–8 show the manner in which power, delivered to rotors 20 and 24, not only lifts the craft, but also provides pushing power. Pushing power is applied during a portion of each of the cycles of rotation of each blade while the craft is in horizontal flight. In order to understand this construction and operation, FIGURE 4 illustrates the conditions existing when pure lift is developed by rotors 20 and 24. FIGURE 5 illustrates the development of pushing power by the rotors 20 and 24. In FIGURE 1, arcs 54 indicate the approximate portion of each rotor blade revolution where drag is induced to produce forward flight.

While the aircraft is in a semi-hover state the drag surfaces 44 may be actuated to provide horizontal thrust in any chosen direction as will be described hereafter.

Figures 6, 7, 8, 9:
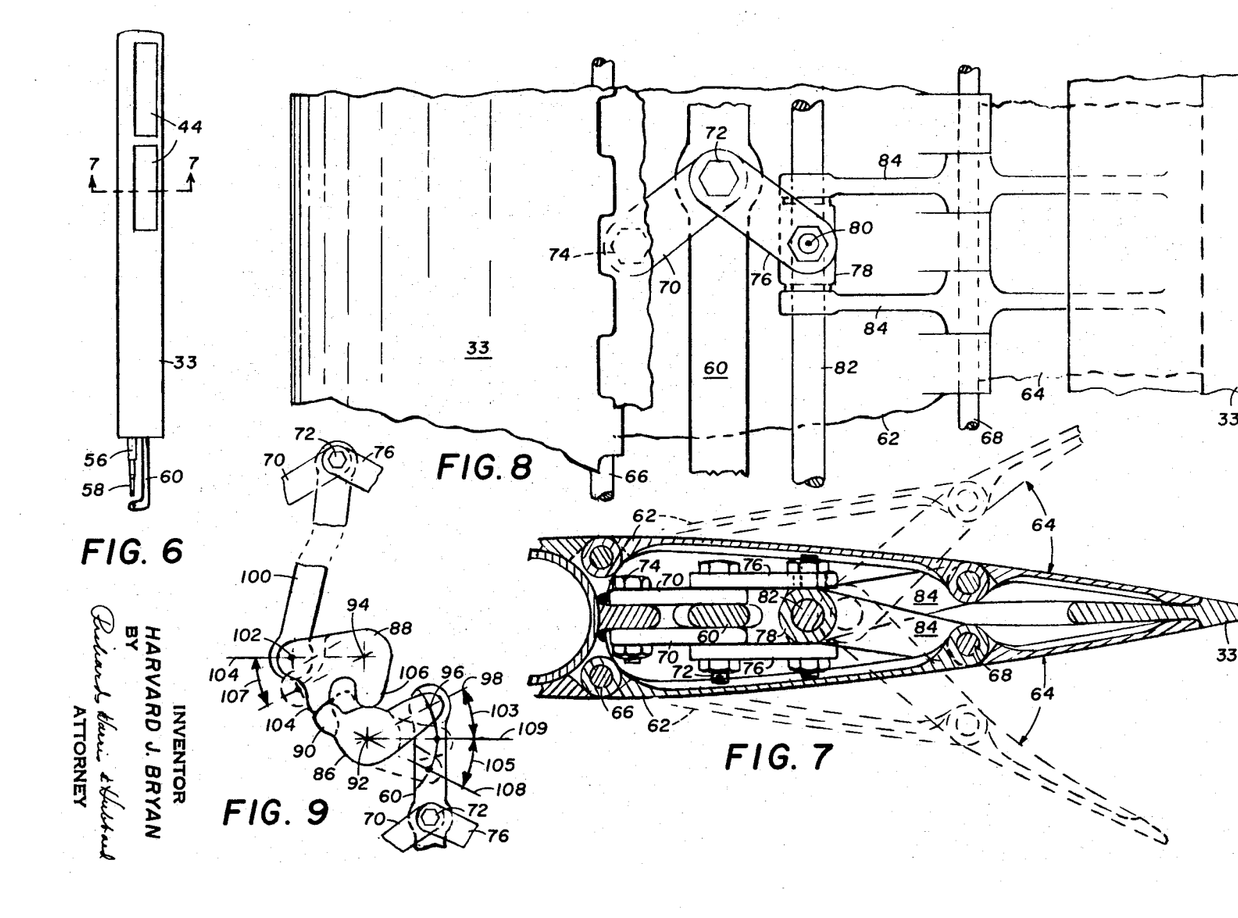
FIGURE 6 is a plan view of a drag prop rotor blade detached from the rotor hub.
FIGURE 7 is an enlarged sectional view of the drag prop rotor blade taken along line 7—7 of FIGURE 6.
FIGURE 8 is a plan view of a small portion of the drag prop rotor blade with upper portions broken away.
FIGURE 9 is a plan view of drag surface actuation linkage.

Referring now to FIGURES 6–8, a rotor blade 33, FIGURE 6, is shown having spar 56 and shaft 58 extending beyond the inward end of blade 33. Drag surfaces 44 are shown separated into two approximately equal pairs and are surrounded by the structure of blade 33. A push-pull rod 60 extends parallel with shaft 58. The rod 60 actuates drag surfaces 44 which are in two sections, 62 and 64, section 62 being forward and section 64 being aft.

As best seen in FIGURES 7 and 8, forward drag surfaces 62 are attached to the rotor blade 33 by hinge pin 66. Aft drag surfaces 64 are attached to forward drag surfaces 62 by hinge pin 68.

In operation, starting in the neutral position with drag surfaces closed, the rod 60 is pulled toward the axis of rotation of the rotors and drag surfaces 44 are actuated by being pushed open. Links 70, attached to rod 60 by bolt 72, pivot about the center of bolt 74, that attaches links 70 to blade 33. Links 76 are attached to rod 60 by bolts 72. When rod 60 is pulled, link 70 moves bolt 72 in an arc about bolt 74. This action forces links 76 to push yoke 78 toward the trailing edge of blade 33 as links 76 pivot about the center of attachment 80 to said yoke 78. Yoke 78 pushes rod 82 aft. By extension arms 84, the aft portion 64 of drag surfaces 44 is pushed open. The forward portion 62 of drag surfaces 44 is pushed open by the same action through its connection to aft portion 64 by hinge pin 68 as forward portion 62 pivots about hinge pin 66. The drag surfaces close when rod 60 is returned to neutral position.

The rotor blades 33 lose lift effects in areas bearing drag surfaces 44 when said drag surfaces are actuated. Therefore, depending upon the use for which the aircraft is designed, it will be possible to vary lengths of actuation linkage, as well as the widths and lengths of forward and aft surfaces 62 and 64 respectively, to cause varied effects of the different pairs of drag surfaces 44.

As shown in FIGURE 9, an additional means of varying effects of drag surfaces 44 is provided by the levers 86, and 88 and cam 90. The levers 86 and 88 are shown in neutral position with dotted lines showing the extent of movement. Lever 86 attaches to the structure of blade 33 at point 92 and level 88 attaches to the structure of blade 33 at point 94. Rod 60 is pivotally attached to lever 86 at point 96 along line 98. Rod 100 is pivotally attached to lever 88 at point 102 and extends to attachment with a second pair of drag surfaces 44 by links 70 and 76 which are attached to rod 100 by bolt 72.

In operation, as the pulling action of rod 60, FIGURE 9, pivots level 86 about point 92 through arc 103, links 70 and 76 attached to rod 60 by bolt 72 actuate the pair of drag surfaces 44 operatively linked therewith. During pivot of lever 86 through arc 103, lever 88 remains unmoved. The drag surfaces 44 operatively linked to lever 88 are locked in neutral position by the action of cam 90 riding against lug 104 of lever 88. Further movement of lever 86 by rod 60 through arc 105, after lever 86 pivots through arc 103, causes cam 90 to contact lug 106 of lever 88. This forces lever 88 to pivot about point 94 through arc 107. The action of lever 88, in pivoting through arc 107, pulls rod 100 and links 70 and 76 attached to rod 100 by bolt 72. This actuates the pair of drag surfaces 44 operatively linked therewith.

In returning drag surfaces 44 to neutral position the action is reversed by the pushing action of rod 60 and the drag surfaces 44 are closed first as lever 86 moves from line 108 through arc 105 to line 109. As lever 86 moves from line 109 through arc 103 to line 98, drag surfaces 44 are closed.

Due to greater force being required to open drag surfaces 44 than is required to close same, cam 90 is designed to mate with lug 106 with minimum friction as this action opens drag surfaces. Sliding action of cam 90 against lug 104 in closing and locking of drag surfaces 44 will require relatively small force.

Figures 10, 14:
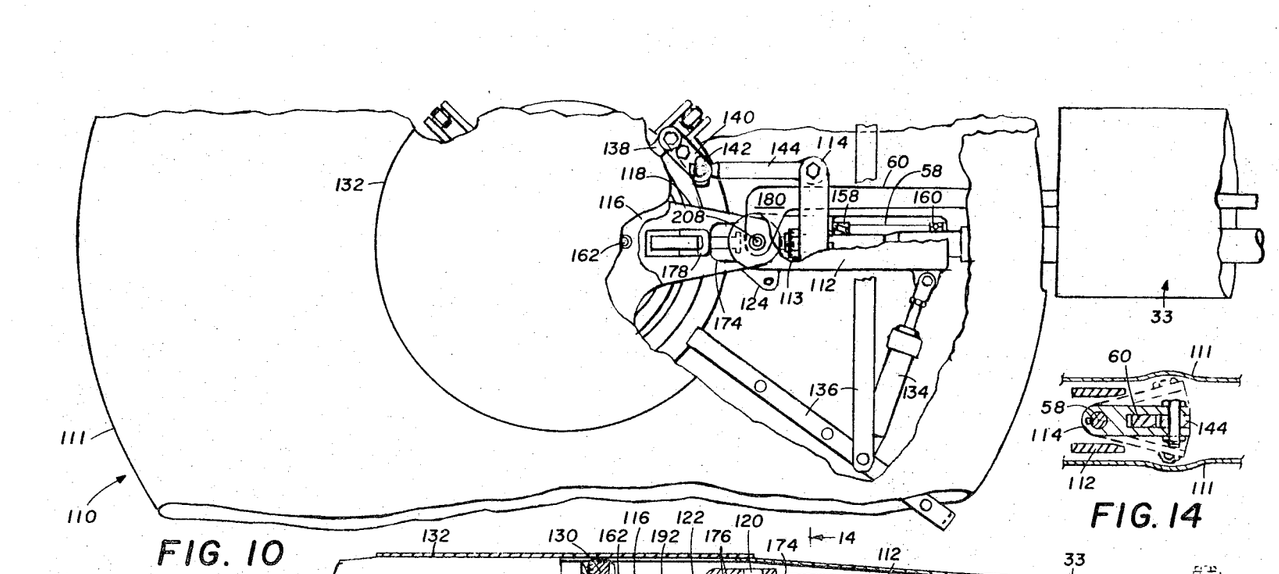
FIGURE 10 is a partial plan view of the drag prop rotor hub with portions broken away to show a typical arrangement of the attachments and controls of a rotor blade.
FIGURE 14 is a sectional view taken along line 14—14 of FIGURE 11 to show movement of rotor blade pitch control horn.
Figures 11, 12, 13:
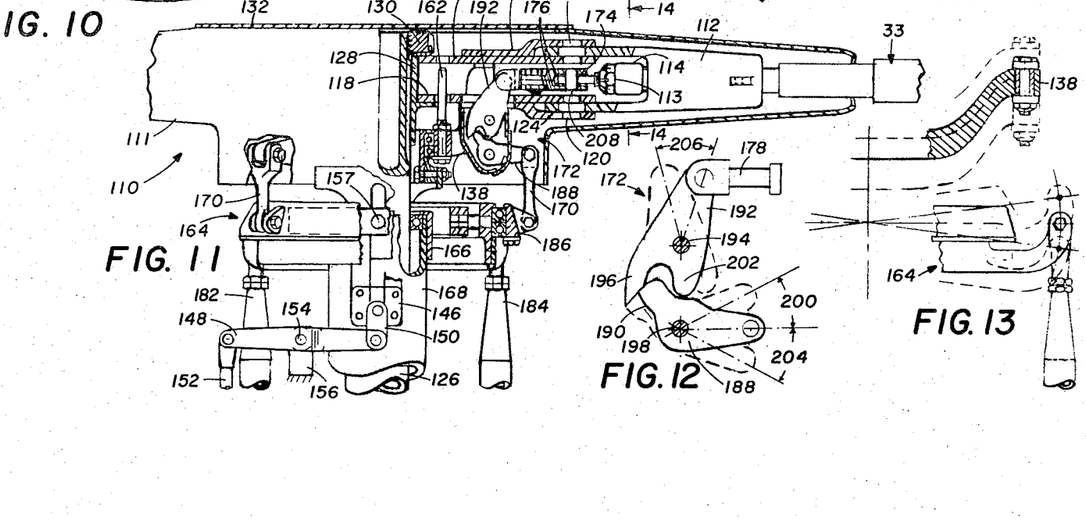
FIGURE 11 is an elevational view of the rotor hub and swash plate with control linkage.
FIGURE 12 is an elevational view of a lever and cam mechanism employed to transmit actuation pulse to rotor drag surfaces.
FIGURE 13 is an elevational view of the swash plate and rotor blade pitch control ring.

Referring now to FIGURES 10 and 11, a rotor hub 110 has a disc-shaped fairing 111 enclosing control mechanisms. Shaft 58 of rotor blade 33 extends through a sleeve portion of arm 112, and is attached thereto by nut 113. Nut 113 also attaches a rotor blade pitch control horn 114 to shaft 58. An arm 112 attaches to upper and lower star plates 116 and 118 respectively by pins 120 and extends radially of hub 110. The star plates 116 and 118 are concentric with said hub 110 and are star-shaped with the outer end of the star points extending radially toward attachment of each rotor blade. Upper star end fitting 122 and lower star end fitting 124 secure pins 120. Star plates 116 and 118 are attached to the rotor drive shaft 126 by fitting 128 and nut 130. An access cover plate 132 concentric with hub 110 is removably attached to fairing 111. A damper 134 links arm 112 to the hub structure 136. A rotor blade collective pitch control spider 138 is concentric with shaft 126. Spider 138 is operatively attached to horn 114 by a pair of upper and lower links 140, a yoke 142 and a finger 144. Spider 138 is rotatably attached to a pitch control assembly 146 which is concentric with shaft 126. Assembly 146 extends downward and is operatively connected with actuation lever 148 by links 150.

In collective pitch control operation of rotor blades, conventional means well known in the art are employed to provide linear movement of push-pull rod 152 to pivot lever 148 about point 154 on support 156 to raise and lower the control assembly 146. Pins 157, extending through slots in control assembly 146, oppose any tendency of said assembly to rotate with hub 110. Spider 138 is rotatably attached to assembly 146 and is operatively linked with each rotor blade pitch control horn 114 by links 140, yoke 142 and finger 144. Spider 138 changes pitch of the rotor blades 33 by rotating shaft 58 (as indicated in FIGURE 14) in bearings 158, and 160 as spider 138 is moved up and down (as indicated in FIGURE 13) by said pitch control assembly 146. Spider 138 rotates with hub 110 as the torque of the hub is transmitted to spider 138 by rods 162. Rods 162 are in fixed relation to spider 138 but are allowed to slide up and down through holes in star plates 116 and 118.

In flight, variations of drag on rotor blades 33 will cause each of blades 33 and arm 112 to pivot, independently of other blades and arms. Pivotal movement is about the vertical axis of pins 120. The resultant lag-lead motion in the plane of rotation of rotor blades 33 is dampened by damper 134. Due to the hinge action of links 140 and finger 144 in the horizontal plane, lag-lead pivoting of blades 33 does not affect pitch of said blades.

The structure for providing periodic actuation of drag surfaces 44 on rotor blades 33 comprises a swash-plate 164. Plate 164 is gimbal mounted on yoke 166, concentric with shaft 126. Plate 164 is supported by mast 168. Links 170 connect swash-plate 164 to pulse control units 172. One of units 172 is attached to each end fitting 124. A push-pull assembly 174, comprising mirror image upper and lower halves 176, rotatably retain a clevis 178. Assembly 174 provides an operative linkage from pulse control unit 172 to a fitting 180 which is integral with rod 60.

The function of pulse control unit 172 is to receive full cyclic pulse effects from the swash-plate 164 and to transmit only the portion of that pulse as needed to actuate drag surfaces 44.

In operation, conventional means well-known in the art are employed to provide linear movement of push-pull rods 182 and 184 for tilting swash-plate 164 in any desired direction. Swash-plate 164 is tilted about a horizontal axis, which intersects the vertical axis of rotation of shaft 126. As seen in FIGURE 13, this results in a tilted plane of rotation of links 170 causing said links to move up and down as they traverse the periphery of swash-plate 164. Links 170 are attached to swash-plate outer ring 186 by means which permit universal pivoting. Links 170 are also attached to lever 188 of pulse control unit 172, by means which permit only pivoting about horizontal attachment thereto. This serves to carry outer ring 186 in rotation with hub 110 as said hub is rotated by shaft 126. When the swash-plate 164 is not tilted and is in neutral position, the drag surfaces 44 are closed and in neutral position. In this state cam 190 of lever 188, as best seen in FIGURE 12, locks said drag surfaces 44 in neutral position by preventing pivotal movement of lever 192 about its horizontal attachment 194.

When the swash-plate 164 is tilted, links 170 are displaced upward. Consequently, lever 188 pivots about attachment 198, through arc 200 as seen in FIGURE 12. This provides horizontal pivotal attachment to pulse control unit 172. Cam 90, moving in an arc about attachment 198, remains in sliding contact with lug 196, thus continuing to prevent pivotal movement of lever 192 and thereby keeping drag surfaces 44 in neutral position.

When tilt of swash-plate 164 displaces links 170 downward, cam 190 contacts lug 202 of lever 192. Concurrently, lever 188 moves in an arc 204 about attachment 198 and forces lever 192 to move in an arc 206 about attachment 194, as shown in FIGURE 12. Movement of lever 192 about attachment 194 displaces push-pull assembly 174 by pivotal attachment thereto and effects actuation of drag surface 44 through attachment of assembly 174 to fitting 180 by pin 208.

Pin 208 is in vertical alignment with pins 120 when controls for actuation of drag surfaces are in neutral position, as can be seen in FIGURE 11. Therefore, the lag-lead pivot axis of rotor blades 33 has a common pivot axis with the drag surface actuation linkage. This prevents any actuation of drag surfaces by lag-lead pivoting of the rotor blades while said drag surface actuation controls are in neutral position. Push-pull assembly 174 pivots about the center of the horizontal shank portion of yoke 178 when the pitch of rotor blades 33 is changed.

Due to greater force being required to open drag surfaces 44 than is required to close same, cam 190 and lug 202 are designed to assure minimum friction along the area of contact as action of cam 190 against lug 202 forces drag surfaces 44 open. Sliding action of cam 190 against lug 196 in closing and locking of drag surfaces 44 requires relatively small force. Pivotal attachments of levers 188 and 192 to pulse control unit 172 and the area of cam action of lever 188 against lever 192 is housed to retain lubricant and protect against friction.

Figures 15, 16, 17, 18:
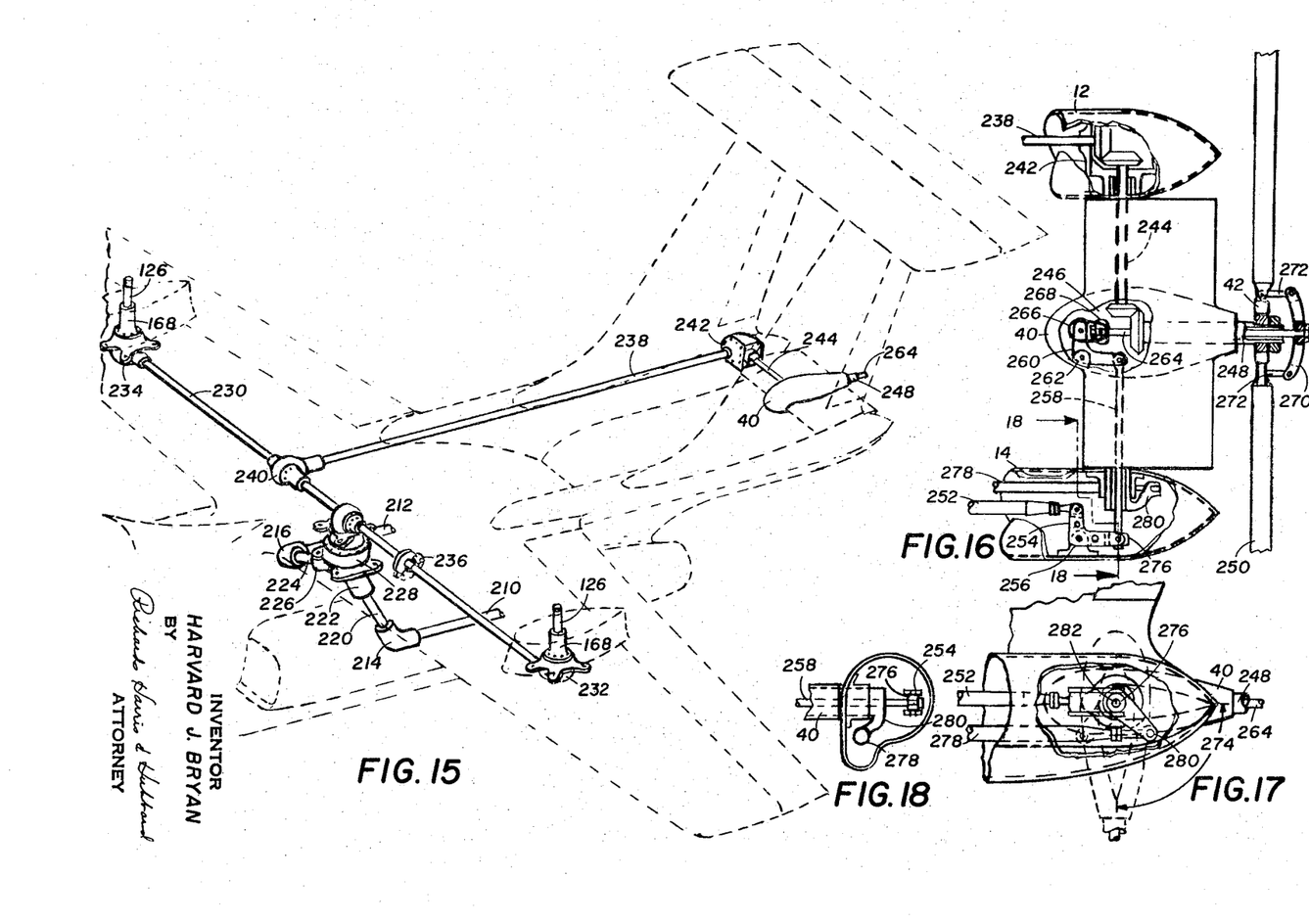
FIGURE 15 is a perspective view of the drive system of the dual rotor, dual power plant aircraft.
FIGURE 16 is a plan view including a portion of the tail booms, and the tail rotor tilt-prop mechanism in horizontal flight position with portions broken away to show inside details of the drive system and actuation means.
FIGURE 17 is an elevational view of the aircraft of FIGURE 16 including a portion of the left tail boom and vertical stabilizer.
FIGURE 18 is a sectional view taken along line 18—18 of FIGURE 16.

Referring now to FIGURE 15, a drive system is shown having two power plants not shown, but which drive shafts 210, and 212 which extend forward from such power plants. Shaft 210 extends forward to gear box 214. Shaft 212 extends forward to gear box 216. Shaft 220 extends from gear box 214 to a free wheel device 222 and shaft 224 extends from gear box 216 to a free wheel device 226. Transmission 228 located at the center of aircraft is powered from either or both power plants to adjust rotational speed from the power source as desired. Torque is thus transmitted to shaft 230 which extends laterally into wings 16 and 18. Shaft 230 is common to gear box 232 in the left wing and gear box 234 in the right wing. Shaft 230 synchronizes rotation of shafts 126 which extend upward from each of gear boxes 232 and 234 supported by masts 168. A rotor brake 236 is provided along shaft 230. Shaft 238 transmits torque from gear box 240 to gear box 242 located in tail boom 12.

As shown in FIGURES 16–18, shaft 244 transmits torque from gear box 242 to gear box 246 in drive unit 40. Tail rotor drive shaft 248 transmits torque from gear box 246 to drive tail rotor 42.

Collective pitch of the tail rotor blades is controlled by displacing push-pull rod 252 linearly, in tail boom 14. The action of bellcrank 254 pivoting about attachment point 256 which is in fixed relation to structure of tail boom 14 is thus employed. The action of bellcrank 254 results in linear displacement of the pivotally attached rod 258 which pivots bellcrank 260 about attachment point 262 which is in fixed relation to gear box 246. The action of bellcrank 260 results in linear displacement of rod 264 through connection thereto by a pair of identical upper and lower links 266 and yoke 268. Linear displacement of rod 264 changes the pitch of rotor blades 250 through fixed relation attachment to spider 270 which is pivotally attached by fitting 272 to each blade 250 at a point offset from pitch changing axis of each blade 250.

Torque of the tail rotor 42 is transmitted to rod 264 by fitting 272 and spider 270 as yoke 268 permits shaft 264 to turn within.

Drive unit 40, FIGURE 17, may be pivoted through arc 274, without affecting pitch setting of blades 250. Yoke 276 permits rod 258 to turn within. Pivoting of drive unit 40 through arc 274 is provided by linear movement of rod 278 as by pivotal attachment to crank 280 which is integral with drive unit 40. This causes crank 280 to pivot drive unit 40 about axis 282 which is common to rod 258 and shaft 244.

Figures 19, 20, 21, 22:
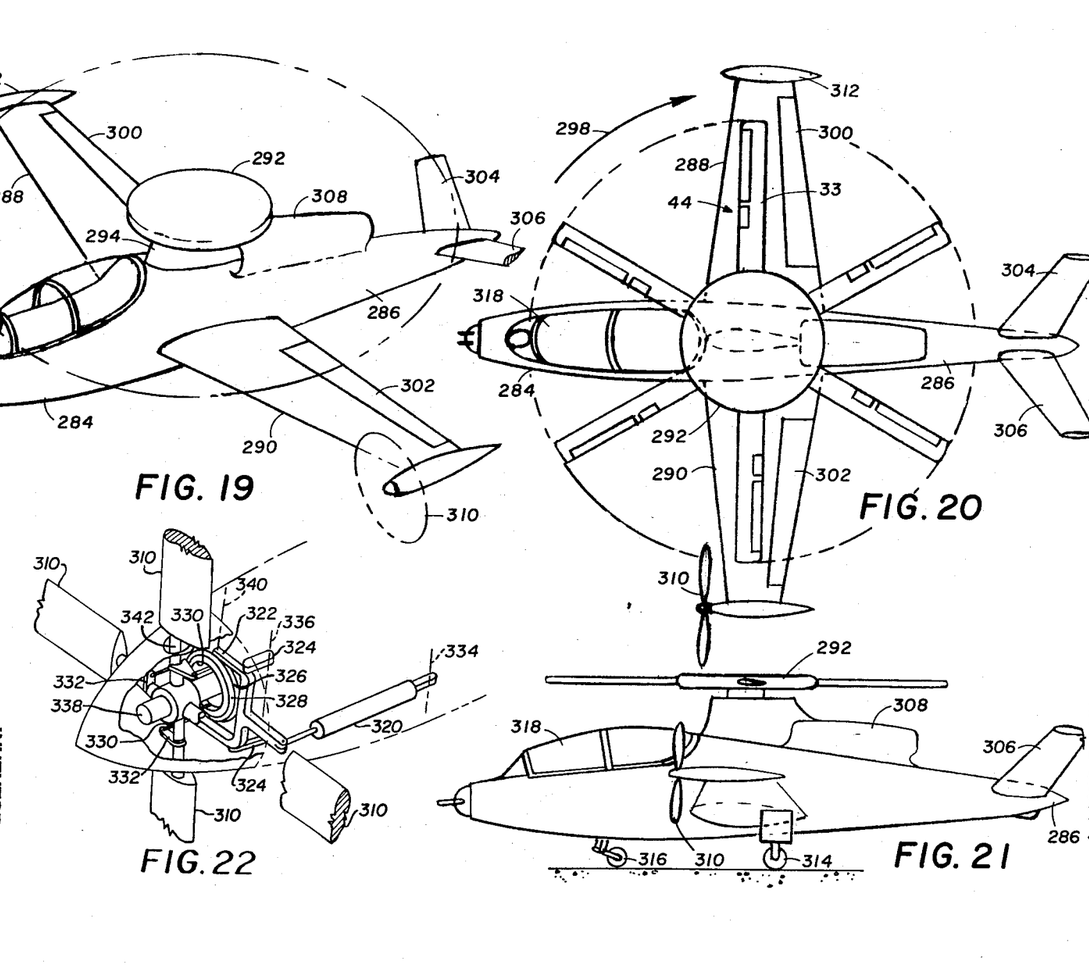
FIGURE 19 is a perspective view of an aircraft of the single drag-prop single engine, configuration.
FIGURE 20 is a plan view of the aircraft of FIGURE 19.
FIGURE 21 is an elevational view of the aircraft of FIGURE 19.
FIGURE 22 is a fragmentary view of the wing-tip mounted propeller of the aircraft of FIGURE 19 showing blade pitch control.

Referring now to FIGURES 19–21, an aircraft is illustrated of a single rotor configuration. The aircraft is of the rotary wing type and comprises a rotor which provides not only vertical lift but horizontal thrust. The unit has a fixed wing and is thus a compound aircraft.

The fuselage 284, FIGURE 19, is provided with a tail boom 286. Wings 288 and 290 extend laterally from fuselage 284 at substantially the midpoint thereof. A rotor 292 is mounted on pylon 294 above fuselage 284 approximately at the center of gravity. The rotor 292 rotates in the direction of arrow 298, FIGURE 20. The wing 288 has a trailing edge flap 300. The wing 290 has a trailing edge flap 302. As seen in FIGURE 20, the rotor 292 comprises six blades 33.

The boom 286 supprts two fins 304, and 306 symmetrically arranged extending at approximately 45° up from horizontal near aft end of said boom. Fuselage 284 supports a power plant 308 along a top center line aft of pylon 294. The wing 290 supports a propeller 310 mounted to rotate about a horizontal axis extending fore and aft. The wing 288 supports a utility pod 312. FIGURE 21 illustrates the aircraft of FIGURES 19 and 20 with a tricycle landing gear. The main landing gear 314 is attached on the wings. The nose landing gear 316 is attached under the cockpit area of fuselage 284. The cockpit 318 provides tandem seating for two people. Power plant 308 provides shaft power for propeller 310 and rotor 292 for vertical and horizontal flight.

The rotor 292 is of the type referred to as drag-prop and is structurally and operationally the same as rotor 24 previously specified, except rotor 292 has six blades 33 and rotor 24 has five blades 33. Actuation means for collective pitch of blades 33 and drag surfaces 44 is the same for rotor 292 as it is for rotor 24 except for the provisions of actuating the additional blade.

For operation of the single rotor configured aircraft, suitable means known in the art are employed to energize actuation means of rotor 292. The propeller 310 is provided with means for controlling collective pitch to counter the torque of the rotor 292 in vertical flight and hover and to provide forward thrust to equalize thrust of rotor 292 in forward flight. Referring to FIGURE 22, there is shown apparatus for controlling the collective pitch of the propeller 310 including a cylinder 320 pivotally attached to the aircraft structure as indicated by line 334 and coupled to a yoke 322 pivotally mounted by means of links 324. An outer ring 326 is pivotally coupled to the yoke 322 and includes a rotating inner-ring 328. The inner-ring 328 connects to the pitch horns 332 of the blades 310 by means of links 330. In operation, extension of the piston rod of the cylinder 320 causes the yoke 322 to pivot by means of links 324 which are themselves pivotally attached to the aircraft structure as indicated by the line 336. Pivoting the yoke 322 causes the outer ring 326 to move linearly on a shaft 338 by means of a pivotal attachment to the yoke 322 at a point indicated by the line 340. The inner-ring 328 rotates with the shaft 338 and is carried linearly along the shaft by movement of the outer ring 326. In turn, the links 330 are moved linearly with respect to the shaft 338 thereby rotating the blades 310 about their lengthwise axis through sleeves 342 to provide collective pitch to said propeller. Varying the lift effects of fins 304 and 306 stabilizes the aircraft in forward flight.

For cargo versions of the converticopter, or any other version having missions that would cause the center of gravity to shift fore and aft, the tilt-prop may be used to balance lift in hover, vertical, or horizontal flight.

One feature adapatable to a war plane version of the invention is that the cockpit need not be under the rotors, thus permitting standard ejection seats to be used. Another feature is the removable fins mounted to pivot about a horizontal axis forward and above the engine air scoops. These fins may serve a threefold purpose; by tilting the trailing edge down to just below the air scoop, the probability of inhalation of foreign matter from the ground into the engines is minimized; with the fins tilted, lift will be increased by causing engine intake air to be pulled from above; and armament pods may be located on the tips of said fins in a manner permitting yaw as well as elevational pivot for aligning with targets while the converticopter is in hover or level flight.

In accordance with the embodiment of FIGURES 19–21, the propeller 310 counters torque of the lift rotor in vertical flight and hover and provides horizontal forward thrust to equalize forward thrust of the drag-prop that is created by induced drag of the rotor blades as previously explained. In high speed forward flight, fixed wings provide sufficient lift for sustained horizontal flight and controlled airfoil surfaces on the tail provide attitude stability.

The drag-prop will more favorably accommodate and render more effective the use of exhaust ports, ram jets, or other means of thrust suitable for locating on the rotor, if that type of power should be chosen. This is feasible because the absence of cyclic pitch of the rotor blades allows blade outer tips to rotate substantially in a common plane in all regimes of flight, contrary to the alternating up and down rotational path of blade outer tips of the commonly known helicopters, where cyclic pitch is employed.

The drag-prop permits the use of a large disc surrounding the rotor hub. The disc-shaped enclosure of the rotor hub may be of a diameter that will be optimum for the intended mission of the aircraft. In any case, it prevents undesirable upward flow of air between inward ends of the rotor blades in vertical flight and hover.

It will now be appreciated that there is an inherent advantage of the drag-prop with the hub disc over the commonly known helicopters that employ cyclic pitch of the rotor blades. The advantage lies in minimizing the undesirable effects of the relatively slow rotational speed of the inward ends of the rotor blades when the aircraft is in high speed horizontal flight. One contributing factor to this advantage is the fact that the rotor blades are unloaded as to lift and have zero angle of attack. Another contributing factor is that the disc that occupies a portion of the area, where the rotor blades would produce this undesirable effect, has less undesirable effect than rotor blades would occupying this area.

It should be understood that the plane of rotation of the rotor blades of this invention does not tilt in producing horizontal movement. This is in contrast with helicopters that employ cyclic pitch of the rotor blades for horizontal thrust. The present invention permits the use of the disc. While it is not essential to the operation of the drag-prop unit, it is unique and highly advantageous.

SUMMARY

This invention involves an aircraft with an elongated body having fixed laterally extending wings. At least one powered multi-blade rotor is positioned above the body. A first rotor control is provided for individually, cyclically, and symmetrically varying the shape of each blade for increased drag during retreat of each blade to provide thrust. A second rotor control is provided for feathering all of the blades about their respective feathering axes for control of the lift.

Preferably the blade comprises an elongated airfoil having like foldable suface portions adjacent the top and bottom of the trailing edges. Control means extend through the blade for unfolding the surface portions equally above and below said airfoil to increase the drag on the airfoil independently of the pitch of the blade. Further, the aircraft has tail structure extending aft with rudder and elevator surfaces thereon. A drive unit on the tail structure is mounted for rotation on a lateral axis. The drive unit has a collective pitch controlled propeller that is powered to rotate about a drive axis perpendicular to the aforesaid lateral axis.

Preferably twin rotary wings are mounted to rotate in counter directions about substantially vertical axes and are mounted above fixed wings. Each rotary wing has a hub with a plurality of airfoil shaped radially extending blades. Pitch control is provided for collectively controlling the angle of attack of said blades in rotation. Cyclic actuation is provided for the drag inducing means to produce horizontal thrust. Control linkages provide for actuating the drag inducing means both separately and simultaneously relative to change of pitch.

In order to provide for gradation in developing thrust, a plurality of variable surface elements are provided on both top and bottom of each rotary blade. A hub is mounted concentrically on a main shaft for each rotary wing. Arms mounted on the hub extend radially relative to the main shaft. A blade is attached to each arm for rotation with the hub and shaft and is connected for individual pivotal movement about its radial axis. The arms are mounted for individual pivotal movement about axes parallel to the shaft at the point of attachment thereof to the hub. Damper links extend from the outer extremities of the arms to the hub to restrict the lag-lead motion of the arms in a plane perpendicular to the main shaft. Like surface portions on each of the blades are foldable symmetrically above and below the chord plane in the aft portion of each blade by control means mounted on the hub. The control means include a first cam lever acting upon a second lever alternately to lock and crank the second lever. A set of linkages connected to the second lever extends through each blade and serves to unfold and lock the surface portions. By this means, drag on the blades is changed independently of the pitch to produce horizontal thrust. Blades on a given hub are sequentially unfolded during like spatial portions of rotation of blades.

In preferred form, the control means extending through each blade includes a pull rod extending lengthwise of the blade and first links pivotally attached to the pull rod and to the blade. Such links move the pull rod in an arc relative to the blade. Such links attach to the blade and cause the pull rod to move closer to the trailing edge of the blade at the point of attachment to the links when the pull rod is pulled. A control shaft extends longitudinally of the blade substantially along the chord plane between the upper and lower foldable surface portions. Second links are pivotally connected to the pull rod and to the control shaft and force the shaft to move closer to the trailing edge of the blade when the pull rod is pulled. Some inwardly extending arms on the foldable surface elements are attached to the shaft to force selected ones of the upper and lower foldable surface portions outward from the chord plane. A mechanism for delaying the actuation of different or additional upper and lower foldable surface portions includes a first cam lever connected to the pull rod. A second lever is actuated by the cam and is operatively linked to the additional foldable surface portions. The cam, during partial movement thereof, locks and prevents unfolding of the additional surface portions but, on further movement, actuates the second lever to unfold the additional surface portions.

Having described the invention in connection with certain specific embodiments thereof, it is to be understood that further modifications may now suggest themselves to those skilled in the art and it is intended to cover such modifications as fall within the scope of the appended claims.

What is claimed is:
1. An aircraft which comprises:
 (a) an elongated body with fixed wings extending laterally therefrom,
 (b) at least one rotor positioned above said body and having a hub with a plurality of airfoil shaped blades extending therefrom, each of said rotor blades comprising a plurality of movable surfaces symetrically arranged with respect to the upper and lower surfaces of the blade,
 (c) power means for driving said rotor,
 (d) first rotor control means for individually, cyclically, and symmetrically varying the shape of each said blade for increased drag during retreat of each blade to provide thrust for said aircraft,
 (e) second rotor control means for feathering all of the blades about their respective feathering axes for control of the lift on said aircraft produced by said blades, and
 (f) means to stabilize the attitude of said aircraft.

2. The combination set forth in claim 1 in which a drive unit is mounted on said aircraft and is rotatable about a transverse axis for stabilizing said aircraft when said rotor lifts said aircraft by collective pitch, and to assist with forward thrust when lift is provided by said wings and the drag on said rotor is cyclically varied.

3. The combination set forth in claim 1 in which said body includes a pair of tail booms extending rearwardly therefrom and in which a drive unit is mounted between said booms for rotation about a transverse horizontal axis and includes a propeller having collective pitch to stabilize said aircraft on lift off and to assist in forward thrust when lift is provided by said wings.

4. The combination set forth in claim 1 in which top and bottom drag surfaces at the trailing edges of each of said blades are movable symmetrical to a plane passing through the plane of rotation of the blades and a pull rod extends through each blade toward the axis of rotation with a transfer means including a swash-plate and a cam operated crank connected to said pull rod for unfolding said drag surfaces when each blade is in a retreating portion of its cycle of rotation.

5. A blade for producing lift and/or thrust on an aircraft which comprises:
   (a) an elongated airfoil having spaced foldable surface portions along the top aft airfoil surface and corresponding spaced foldable surface portions along the bottom aft airfoil surface with each of said foldable surface portions having arms extending inwardly into said blade,
   (b) a powered shaft having mounting means for said blade for rotation of said blade relative to the axis of said shaft and for rotation of said blade about a pitch axis, and
   (c) control means extending through said blade for unfolding said surface portions equally above and below said airfoil to increase the drag on said airfoil independently of the pitch of the blade, said control means including:
      (i) a pull rod extending lengthwise of said blade,
      (ii) first links pivotally attached to said pull rod and to said blade to move said pull rod in an arc relative to the point said links attach to said blade and to cause said pull rod to move closer to the trailing edge of said blade at the point of attachment to said links when said pull rod is pulled,
      (iii) a control shaft extending longitudinally of said blade substantially along the chord plane between the upper and lower foldable surface portions,
      (iv) second links pivotally connected to said pull rod and to said control shaft, to force said shaft to move closer to the trailing edge of said blade when said pull rod is pulled, some of said inwardly extending arms being attached to said shaft to force selected ones of the upper and lower foldable surface portions outward from the chord plane, and
      (v) a mechanism for delaying the actuation of different upper and lower foldable surface portions, said mechanism including a first lever with a cam thereon, said first lever being connected to said pull rod, and a second lever actuated by said cam and operatively linked to said different foldable surface portions, said cam, during partial movement thereof, locking and preventing unfolding of said different surface portions and, on further movement, actuating said second lever to unfold said different surface portions.

6. A rotary winged aircraft comprising:
   (a) a fuselage having fixed wings,
   (b) a tail structure extending aft from said fuselage and having rudder and elevator surfaces thereon,
   (c) a drive unit on said tail structure mounted for rotation on a lateral axis, said unit having a collective pitch controlled propeller that is powered to rotate about a drive axis perpendicular to said lateral axis,
   (d) twin rotary wings mounted to rotate in counter directions about substantially vertical axes and mounted above said fixed wings,
   (e) said rotary wings each having a hub with a plurality of airfoil shaped blades extending radially therefrom,
   (f) pitch control means for collectively controlling the angle of attack of said blades in rotation,
   (g) drag inducing means on each of said rotor blades comprising a plurality of movable surfaces symmetrically arranged with respect to upper and lower surface of the blades,
   (h) cyclic actuation means for said drag inducing means to produce horizontal thrust,
   (i) actuation control linkages for actuating said drag inducing means both separately and simultaneously relative to actuation of said pitch control means, and
   (j) source means for powering said drive unit and said rotary wings.

7. The combination set forth in claim 6 in which collective pitch control means is provided for said propeller and attitude control means is provided to rotate said drive unit about said lateral axis without changing the collective pitch setting of said propeller.

8. The combination set forth in claim 7 in which a single source means powers both said propeller and said rotary wings.

9. A rotary winged aircraft comprising:
   (a) a fuselage having fixed wings,
   (b) a twin tail boom structure extending aft from said fuselage and having vertical stabilizers extending upward from each tail boom joined at their upper ends by a horizontal stabilizer having elevator surfaces thereon and said vertical stabilizers having rudders thereon,
   (c) a drive unit mounted between said booms for rotation on a lateral axis, said unit having a collective pitch controlled propeller that is powered to rotate about a drive axis perpendicular to said lateral axis,
   (d) twin rotary wings mounted to rotate in counter directions about substantially vertical axes and mounted above said fixed wings,
   (e) said rotary wings each having a hub with a plurality of airfoil shaped blades extending radially therefrom,
   (f) pitch control means for collectively controlling the angle of attack of said blades in rotation,
   (g) drag inducing means on each of said rotor blades comprising a plurality of movable surfaces symmetrically arranged with respect to upper and lower surfaces of the blades,
   (h) cyclic actuation means for said drag inducing means to produce horizontal thrust, and
   (i) actuation control linkages for actuating said drag inducing means both separately and simultaneously relative to actuation of said pitch control means.

10. A rotary winged aircraft comprising:
    (a) a fuselage having fixed wings,
    (b) a tail structure extending aft from said fuselage and having controllable surfaces thereon for elevation and direction control,
    (c) a rotary wing mounted to rotate about a substantially vertical axis above said fuselage,
    (d) said rotary wing having a hub with a plurality of airfoil shaped blades extending radially therefrom,
    (e) pitch control means for collectively controlling the angle of attack of said blades in rotation,
    (f) drag inducing means on each of said rotor blades comprising a plurality of movable surfaces symmetrically arranged with respect to upper and lower surfaces of the blade,
    (g) cyclic actuation means for said drag inducing means to produce horizontal thrust,
    (h) actuation control linkages for actuating said drag inducing means both separately and simultaneously relative to actuation of said pitch control means, and
    (i) a driven propeller mounted on said aircraft to counter the torque produced on said fuselage by rotation of said rotor.

11. A rotary winged aircraft comprising:
    (a) a fuselage having fixed wings,
    (b) a tail structure extending aft from said fuselage and having control surfaces for elevational and directional control,
    (c) a rotary wing mounted to rotate about a substantially vertical axis above said fuselage,
    (d) said rotary wing having a hub with a plurality of airfoil shaped blades extending radially therefrom.
    (e) pitch control means for collectively controlling the angle of attack of said blades in rotation, (f) drag inducing means on each of said rotor blades comprising a plurality of movable surfaces symmetrically arranged with respect to upper and lower surfaces of the blade, (g) cyclic actuation means for said drag inducing means to produce horizontal thrust, (h) actuation control linkages for actuating said drag inducing means both separately and simultaneously relative to actuation of said pitch control means, (i) a driven propeller mounted on one of said wings, and (j) means to control said propeller to counter the torque produced on said fuselage by rotation of said rotor during vertical flight and hover and to equalize horizontal thrust of said rotary wing while said drag inducing means is in effect.

12. A rotor for producing lift and/or thrust on an aircraft which comprises:

(a) a hub, (b) a plurality of elongated blades extending radially from said hub having like foldable surface portions along the top and bottom of the trailing edges thereof, (c) means for mounting said blade on said hub for rotation with said hub and for rotational adjustment about a pitch axis thereof, (d) control means mounted on said hub and extending through said blade for unfolding said surface portions equally above and below said blades, and (e) means to actuate said control means during like spatial portions of each cycle of rotation of said blade sequentially to increase the drag on said blades independently of the pitch of the blades.

13. A rotor system for producing lift and/or thrust on an aircraft which comprises:

(a) a shaft, (b) a hub mounted concentrically on said shaft, (c) a plurality of arms mounted on said hub and extending radially relative to said shaft, (d) an elongated blade attached to each of said arms for rotation with said hub and said shaft and connected for individual pivotal movement about radial axes of said arms, (e) means for mounting said arms for individual pivotal movement about axes parallel to said shaft at the point of attachment thereof to said hub, (f) damper links extending from the outer extremities of said arms to said hub to restrict the lag-lead motion of said arms in a plane perpendicular to the axis of said shaft, (g) like surface portions on each of said blades foldable symmetrically above and below the chord plane in the aft portion of each blade, (h) control means mounted on said hub including a first cam lever acting upon a second lever alternately to lock and crank said second lever, (i) a set of linkages, one extending through each said blade, for unfolding and for locking said surface portions, said linkages being respectively connected to said second levers, and (j) means for actuating said control means to increase the drag on said blades independently of the pitch of said blades to produce horizontal thrust by sequentially unfolding said surface portions during like spatial portions of rotation of blades.

14. The combination set forth in claim 1 in which said rotor includes an enlarged circular impervious means for preventing the upward flow of air in the region of the rotor axis.

15. An aircraft which comprises:

(a) an elongated body with fixed wings extending laterally therefrom, (b) a pair of rotors, one positioned above each of said wings, each having a hub with a plurality of airfoil shaped blades extending therefrom, each of a plurality of movable surfaces symmetrically arranged with respect to the upper and lower surface of the blade, (c) power means for synchronously driving said rotors counter to one another, (d) a first control means for individually, cyclically, and symmetrically varying the shape of each of said blades for increased drag during retreat of said blade to provide thrust for said aircraft, (e) second rotor control means for feathering all of the blades about their respective feathering axis for control of the lift on said aircraft produced by said blades, and (f) means to stabilize the attitude of said aircraft.

16. A blade for producing lift and/or thrust on an aircraft which comprises:

(a) an elongated airfoil having like foldable surface portions along the top and bottom of the trailing edges thereof, each of said foldable surface portions comprising a first surface section of said airfoil hinged at the surface of said airfoil along a first hinge line intermediate the chord length of the airfoil and a second surface section hinged to said first surface section along a second hinge line located about midway between said first hinge line and the trailing edge of said airfoil, (b) means for mounting said blade for rotation about a pitch axis thereof, and (c) control means extending through said blade for unfolding said surface portions equally above and below said airfoil to increase the drag on said airfoil independently of the pitch of the blade.

17. The combination as set forth in claim 16 wherein:

(a) each of said foldable surface portions includes inwardly extending arms, (b) said control means includes a pull rod extending longitudinally within said blade, and (c) toggle means which includes a crank which is coupled to the second hinge point on both the top and bottom foldable surface portions by way of said arms and to said pull rod by way of said crank to push said surface portions outward of the airfoil.

References Cited

UNITED STATES PATENTS

| | | | |
|---|---|---|---|
| 1,973,017 | 9/1934 | Rothenhoefer | 244—113 |
| 2,344,945 | 3/1944 | Knox | 244—113 X |
| 2,462,459 | 2/1949 | Bigelow | 244—113 |
| 2,483,480 | 10/1949 | Stalker | 244—17.23 |
| 2,668,595 | 2/1954 | Kaman | 170—135.24 |
| 2,695,674 | 11/1954 | Kaman | 170—135.24 |
| 2,825,514 | 3/1958 | Focke | 244—7 |
| 2,845,132 | 7/1958 | Heckman | 244—17.25 |
| 2,918,978 | 12/1959 | Fanti | 170—160.24 |
| 2,372,481 | 3/1945 | Gagas | 170—160.24 |
| 2,021,470 | 11/1935 | Upson | 170—160.1 |

MILTON BUCHLER, *Primary Examiner.*

T. W. BUCKMAN, *Assistant Examiner.*